United States Patent [19]

Staggs et al.

[11] Patent Number: 4,490,797

[45] Date of Patent: Dec. 25, 1984

[54] METHOD AND APPARATUS FOR CONTROLLING THE DISPLAY OF A COMPUTER GENERATED RASTER GRAPHIC SYSTEM

[75] Inventors: Kevin P. Staggs, Glendale; Charles J. Clarke, Jr., Phoenix, both of Ariz.

[73] Assignee: Honeywell Inc., Phoenix, Ariz.

[21] Appl. No.: 340,141

[22] Filed: Jan. 18, 1982

[51] Int. Cl.[3] ...................... G06F 3/153; G06K 15/20

[52] U.S. Cl. .................................... 364/522; 340/703; 340/721

[58] Field of Search ................ 364/521, 522; 340/703, 340/721, 735, 745, 790

[56] References Cited

U.S. PATENT DOCUMENTS

| | | | |
|---|---|---|---|
| 3,906,480 | 9/1975 | Schwartz et al. | 340/739 X |
| 4,149,184 | 4/1979 | Giddings et al. | 340/703 X |
| 4,156,237 | 5/1979 | Okada et al. | 364/522 X |
| 4,200,866 | 4/1980 | Strathman | 340/703 |
| 4,247,843 | 1/1981 | Miller et al. | 340/721 X |

*Primary Examiner*—Jerry Smith
*Attorney, Agent, or Firm*—E. W. Hughes; L. J. Marhoefer

[57] ABSTRACT

Method and apparatus for controlling the display of a raster scan color cathode ray tube. The tube is provided with an orthogonal array of picture elements (pixels) with each picture element having a unique binary address. An addressable memory having memory locations with addresses corresponding to those of the picture element has stored in such memory locations an address of a location in a color look-up memory for an alphanumeric color, for a graphic color and priority signals. In the color look-up memory at the addressed locations is stored binary signals representing the color and intensity of a pixel. In synchronism with the raster scan of the picture elements of the cathode ray tube, there is read from the memory graphic color addresses, alphanumeric color addresses and priority signals for each pixel. One of the addresses, either the graphic or alphanumeric, is applied to the color look-up memory, with the address that is applied being determined by the binary priority signals. The binary color signals stored at the addressed color look-up memory location represent varying intensities of a plurality of predetermined colors. The color signals are converted by a digital to analog converter into analog signals which are applied to the color cathode ray tube to control the color and intensity of each pixel as it is scanned.

8 Claims, 12 Drawing Figures

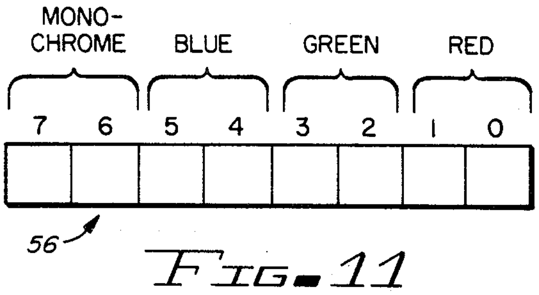
FIG. 11
$$(\overline{Pr-\emptyset})+(\overline{GrAd})+(\overline{Pr-1}\cdot AnFAd)=AnDs$$
FIG. 3
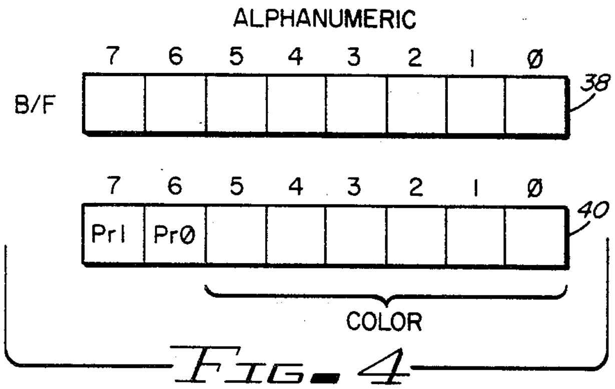
FIG. 4
58
| | | |
|---|---|---|
| Ø | Ø | NO INTENSITY (BLACK) |
| Ø | 1 | 1/3 INTENSITY |
| 1 | Ø | 2/3 INTENSITY |
| 1 | 1 | FULL INTENSITY |
FIG. 12
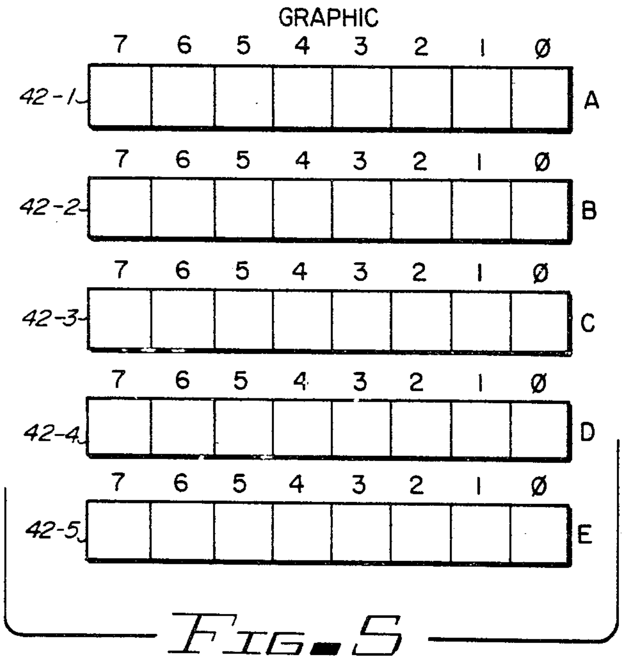
FIG. 5

| Pr-Ø | Pr-1 | |
|---|---|---|
| Ø | Ø | AnDs > GrDs |
| 1 | Ø | AnFDs > GrDs > An$\overline{F}$Ds |
| Ø | 1 | AnDs > GrDs |
| 1 | 1 | GrDs > ArDs |

METHOD AND APPARATUS FOR CONTROLLING THE DISPLAY OF A COMPUTER GENERATED RASTER GRAPHIC SYSTEM

BACKGROUND OF THE INVENTION

1. Field of the Invention

This invention is in the field of computer generated raster graphics and, more particularly, relates to methods and apparatus for determining between two types of displays, alphanumeric or graphic, which shall control the intensity and color of each picture element of the reaster of a cathode ray tube.

2. Description of the Prior Art

Alphanumeric raster scan CRT displays form a principal communication link between computer users and their hardware/software systems. The basic display device for computer generated raster graphics is the CRT monitor, which is closely related to the standard television receiver. In order for the full potential of raster graphics to be achieved, such displays require support systems which include large-scale random-access memories and digital computational capabilities. As the result of recent developments of large-scale integrated circuits, the price of digital memories has been reduced significantly and computers in the form of microcomputers are available which have the capability of controlling the displays at affordable prices. As a consequence, there has been a surge of development in raster graphics. Typically, each pixel in a rectangular array of the picture elements of a CRT is assigned a unique address, comprising the x and y coordinates of each pixel in the array. Information to control the display is stored in a random-access frame memory (RAM) at locations having addresses corresponding to those assigned to the pixels. The source of pixel control data stored in the RAM is typically a microcomputer located in a graphic controller which will write into the addressable memory locations the necessary information to determine the type of display. This frequently is an address in a color look-up memory, at which location there is stored the necessary binary color control signals to control the intensity of the color of each pixel of an array. The horizontal and vertical sweep of the raster scan is digitized to produce the addresses of the pixels, which addresses are applied to the frame memory in which the controller has previously written the information determinative of the display. This information can be an address in a color look-up memory. The data is read out of the addressed location in the color look-up memory and the necessary color control signals are obtained. The color signals are converted to analog signals and applied to the three color guns of the typical CRT to control the intensity and color of each pixel as it is scanned.

There are basically two kinds of displays that can be produced by a raster graphics system, one being an alphanumeric type display in which alphanumeric symbols are displayed in cells of uniform size, and the other being a graphic type display in which the color and intensity of each pixel is uniquely determined, and which is used for drawing lines and geometric figures, for example.

It is frequently the case that for each pixel of the array there is stored in the RAM of the raster graphic system, sometimes called the frame memory, information for both an alphanumeric type or mode of display and a graphic type or mode of display. Prior to this invention, there has been no way in which the priority of type, or mode, of display, the color and intensity of each pixel of the raster, is controlled on a pixel by pixel basis where two or more types of display information have been written into the frame memory for one or more pixels.

SUMMARY OF THE INVENTION

The present invention provides both method and apparatus for controlling the display that is visually observable by a human being, and which is produced by a raster scan of an array of pixels of a color cathode ray tube. Each pixel has associated with it an address. There is also provided an addressable frame memory in which at each addressable location corresponding to that of a picture element there is stored an address of a location in a color look-up memory for an alphanumeric color, both background and foreground, for a graphic color, and priority signals. In addressable locations of the color look-up memory, there are stored binary color control signals representing the color and intensity of the pixel. The horizontal and vertical sweep signals of the raster scan logic of the CRT are digitized to produce the addresses of the pixels. These addresses are applied to the frame memory. The data read from the addressed locations in the frame memory, which are read from the frame memory substantially in synchronism with the raster scan of the CRT, include graphic color addresses, alphanumeric color addresses and priority signals for each pixel of the raster scan array. The color look-up address having priority is determined by a color look-up address selector to which the priority signals are applied and the selected color address is applied by the selector to the color look-up memory. The color control signals stored at the addressed color look-up memory location are fetched and applied to digital to analog circuits which convert the binary color control signals into analog signals. The analog color control signals for each predetermined color are applied to the cathode ray tube to control the color and intensity of each pixel of the raster as it is scanned.

It is, therefore, an object of this invention to provide an improved method and apparatus for controlling the images displayed by a computer-generated scan color CRT.

Another object of this invention is to provide a method and apparatus for controlling which of two types of displays, alphagraphic or alphanumeric, will displayed by a raster graphics system.

A still further object of this invention is to provide method and apparatus for controlling which of two types of displays will control the color and intensity of a given pixel by means of priority control signals which are stored in a random-access memory at locations associated with the pixels being scanned.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 3 illustrates the logic equation describing the function of the color look-up address selector;

FIG. 4 illustrates the format of the information stored in a pixel address location containing alphanumeric and priority information with respect to each pixel of a line segment;

FIG. 5 illustrates a format of the graphic information for the pixels of a line segment as stored in the alphagraphic memory;

FIG. 11 illustrates the format of the control signals stored in each color look-up memory location; and FIG. 12 is a truth table showing the relationships of the digital color control signals and the intensity of the color displayed.

DETAILED DESCRIPTION OF THE INVENTION

Figure 1:
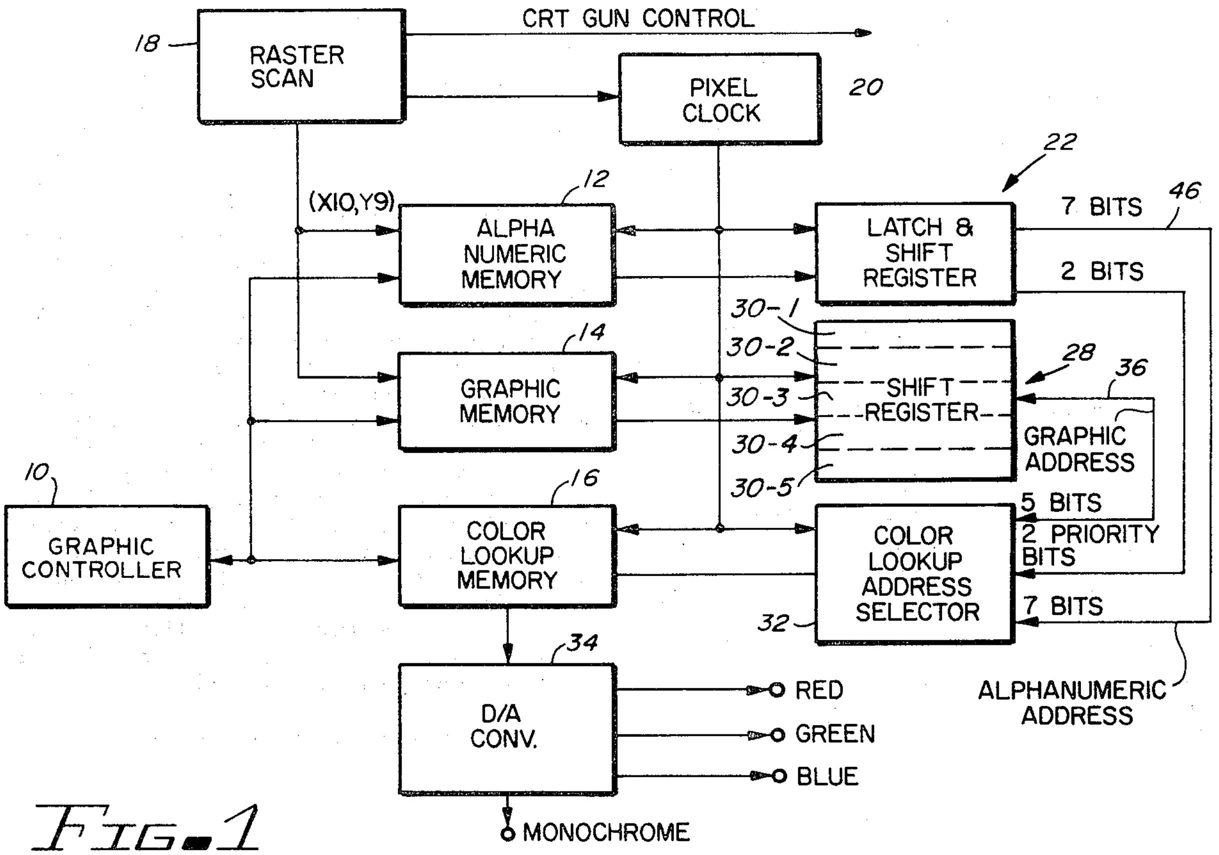
FIG. 1 is a schematic block diagram of the apparatus for controlling a computer-generated raster scan color CRT of the invention.

In FIG. 1, there is illustrated apparatus for controlling the images displayed by a computer-generated, or controlled, raster graphic system. Graphic controller 10 has the capability of writing into random-access alphanumeric memory 12, graphic memory 14, which together constitute frame memory 15 and color look-up memory 16, binary digital information that is used to control the intensity and color of each picture element, pixel, of a conventional color CRT monitor which is not illustrated. Raster scan logic 18 of a conventional CRT device includes conventional digitizing circuits to digitize the horizontal and vertical sweep signals of the raster scan of the CRT monitor so that for each pixel on the face of the CRT there is a number or address. To uniquely identify each of the 640 pixels in a horizontal line and in the 480 vertical lines of a standard CRT raster requires a 19-bit address with the "x" component comprising 10 bits and the "y" component 9 bits. The "x" address corresponds to the ordinate and the "y" to the abscissa of the pixels of the substantially rectangular raster. While in FIG. 1 the alphanumeric memory 12, graphic memory 14, and color look-up memory 16 are indicated as being separate, they may be combined, or located, in a single conventional random-access memory. Pixel clock 20 produces a clock pulse each time that a pixel in the raster is scanned. The output of the pixel clock 20 is used to read data from memories 12, 14 and 16, as well as by the control circuitry of this invention, as will be described later.

To minimize the size of the memory, memories 15 and 16, and to permit the use of slower memories, the color look-up addresses for the alphanumeric type display and the graphic memory type display are read from memory for a group, or set, of eight adjacent pixels lying in a horizontal line. The eight adjacent pixels lying in a horizontal line define a horizontal line segment. The alphanumeric color look-up address will have, in the preferred embodiment, stored with it, priority signals, Pr 1, Pr Ø, which determine whether the alphanumeric display or the graphic display will control the color and intensity of a given pixel. Thus, in the preferred embodiment, two bytes of 8 bits each are stored in each addressable memory location of alphanumeric memory 12 at an address corresponding to one of the eight pixels of a line segment, normally the first pixel scanned by the electron beams of the electron guns of a CRT monitor. The two bytes as they are read out of the alphanumeric memory 12 are stored in alphanumeric buffer circuit 22 which consists in the preferred embodiment of a latch 24 and a shift register 26, with one byte being loaded into the latch 24 and one byte into shift register 26 of buffer circuit 22. Graphic memory 14 also has stored at each addressable location corresponding to one of the eight pixels of each line segment of the raster five 8-bit bytes. The five bytes as they are read out of graphic memory 14 are stored in graphic buffer circuit 28 which, in the preferred embodiment, consists of five shift registers 30-1 to 30-5, with one byte being loaded in each shift register 30-1 to 30-5. With each clock pulse from pixel clock 20, 7 bits of an alphanumeric color address are transmitted from latch 24 and shift register 26 to color look-up address selector 32, and two priority bits, Pr Ø and Pr 1, which are stored in latch 26, as will be explained in more detail later. Simultaneously, 5 bits of the graphic color address are transmitted to color look-up address selector 32, with one bit being shifted out of each of the shift registers 30-1 to 30-5 with each pixel clock pulse. Based on the values of the two priority bits, Pr Ø and Pr 1, the color look-up address selector 32 will apply to color look-up memory 16, the 7 bits of the alphanumeric color address, or the 5 bits of the graphic color address.

In color look-up memory 16 at locations having addresses corresponding to the color addresses applied by alphanumeric buffer circuit 22 and graphic buffer circuit 28, there are are stored color control signals which are used to control the intensity of the electron beams of the color guns of a conventional color CRT monitor which determine the color and intensity of, or produced by, each pixel of the array as it is scanned. An 8-bit byte is stored in color look-up memory 16 at locations corresponding to the color addresses applied. In synchronism with the scanning of each pixel of the array, or raster, of the pixels being scanned, an 8-bit byte, the color control signal, is read out of color look-up memory 16 and applied to D to A converter 34 which converts 6 of the 8 binary signals into analog signals for controlling the intensity of the red, green and blue electron beam guns of a conventional CRT monitor. In addition, in the preferred embodiment, two bits of the controller signal are applied to a fourth D to A converter which converts these two bits into a monochrome analog signal that can be used to produce a permanent record of the raster display using conventional equipment, as is well known in the art.

Figure 2:
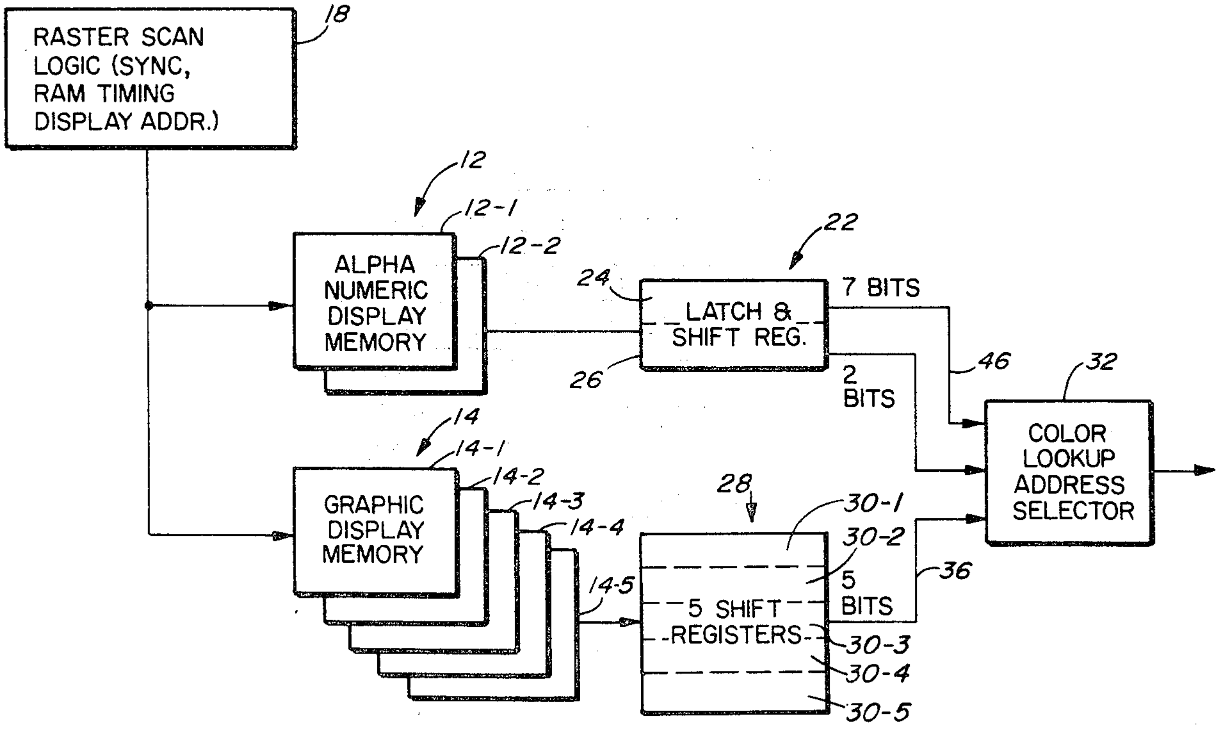
FIG. 2 is a schematic block diagram in greater detail of the memory and apparatus for selecting which color look-up address is applied to the color look-up memory.

In FIG. 2, additional details of the alphanumeric and graphic display memories 12 and 14 are illustrated. Raster scan logic 18 applies in synchronism with the horizontal and vertical sweep signals controlling the scanning of the pixels of the color CRT monitor, binary signals which are coordinates, or addresses of the pixels, as scanned. For each line segment of eight pixels there if stored in alphanumeric display memory 12 and in graphic display memory 14 appropriate information for controlling the display of each pixel of each line segment as it is scanned. In the preferred embodiment, the alphanumeric display memory 12 has two planes, 12-1 and 12-2. Each addressable location of each plane 12-1 and 12-2 has the capacity for storing a byte of 8 bits. Graphic display memory 14 has five planes 14-1 to 14-5. Each addressable location of each plane has the capacity for storing a byte. With respect to the two bytes that are read from alphanumeric display memory 12, one is loaded into conventional latch circuit 24 which has the capacity for storing 8 bits, and the other byte is loaded into a conventional shift register 26 that has the capacity for storing 8 bits. Shift register 26 will read out, or shift out, one bit for each pixel clock pulse applied to it. The bits shifted out of shift register 26 are the background/foreground, B/F, bits where B=OVSF/ . Each of the bits B/F is concatenated with six bits from latch 24 to form a seven-bit alphanumeric color address. The remaining two bits in the byte stored in latch 24 are the priority bits Pr 1, Pr ∅ which are applied with each pixel clock pulse to color look-up address selector 32. Similarly, the five bytes for each addressable location of a given line segment of pixels stored in graphic memory 14 will be loaded into the five shift registers 30-1 to 30-5, with one byte being stored in each shift register. With each clock pulse from pixel clock 20, each shift register 30-1 to 30-5 will produce, or shift out, one bit so that a total of five bits, a graphic color address, are applied on graphic address bus 36 to color look-up address selector 32.

The logic equation that describe the function of color look-up address selector 32 is illustrated in FIG. 3. The equation of FIG. 3 is derived from truth table 54 of FIG. 6 using standard Boolean algebra techniques. In FIG. 3, the signal Pr-∅ and the signal Pr-1, are priority bits which are stored in latch 24 of buffer 22. The signal GrAd for graphic address is produced by applying all of the graphic address signals produced by the five shift registers 30-1 through 30-5 to OR gate 48 in FIG. 6. The signal AnFAd for an alphanumeric foreground address is the renamed background/foreground bit B/F produced by shift register 26 in synchronism with the scanning of each pixel and is true whenever F is true.

The binary signal AnDs for alphanumeric display selects, enables, or determines which one of three possible color lookup memory addresses applied to color lookup address selector 32, is applied to color lookup memory 16. The alphanumeric address, or alphanumeric display, will have priority at such time as signal Pr-∅ is true, at such time as the signal $\overline{\text{GrAd}}$ is true, or at such time as the term (Pr-1.AnFAd) is true, where, a function, or signal, is true when it has a logical 1 value. At such time as none of the three terms of the equation of FIG. 3 is true, a graphic display signal GrDs, where GrDs=$\overline{\text{AnDs}}$ is produced which causes the binary signals of a graphic address to be applied to color lookup memory 16. In the foregoing, $\overline{\text{AnDs}}$ or GrDs when true causes address selector 32 to apply a five bit graphic address to be applied to color lookup memory 16. As a result when GrDs is true the pixel being scanned displays the graphic color and intensity.

At such time as the signal AnDs is true, the color and intensity of the pixel of the CRT monitor being scanned at that time is that of the alphanumeric mode or type of display which includes two different displays, one the alphanumeric foregoing display AnFDs and one for the alphanumeric background display, An$\overline{\text{F}}$DS depending on the value of F. Thus, there are, in fact, two alphanumeric color lookup memory addresses and two alphanumeric type displays for each pixel, one for the foreground color and one for the background/foreground bit B/F. In the alphanumeric type, or mode, of display, the background and foreground colors are generally, but not necessarily, the same color, but if the same color they will differ in intensity with foreground pixels of a given alphanumeric display, typically being brighter than the background pixels.

In FIG. 4, the formats of the two bytes that are read out of alphanumeric memory are illustrated. Byte 38 contains bits which determine whether the alphanumeric display for each of the pixels of a line segment will be background or foreground which is indicated by the letters B/F. In the second byte 40, bits ∅-5 are the lower order bits of the color address for an alphanumeric display. Bit positions 6 and 7 of byte 40 are the priority bits Pr ∅ and Pr 1.

In FIG. 5, the formats of five bytes 42-1 to 42-5 that are stored in each of the addressable locations of graphic memory 14 are illustrated. The eight bits of each byte 42-1 to 42-5 which are loaded into the five shift registers 30-1 to 30-5 are then read out of, or shifted out of, shift registers 30-1 to 30-5 in synchronism with the raster scan with each of the shift registers 30-1 to 30-5 transmitting a bit for each pixel clock pulse produced by pixel clock 20. Thus, all the bits in the ∅ bit position of bytes 42-1 to 42-5 will be read out on the first clock pulse after the bytes are loaded into the shift registers 30-1 to 30-5, or at the beginning of a scan of a given line segment. On the occurrence of the next clock pulse, the bits in bit position 1 are shifted out, those in the second bit position next, etc. At the completion of the reading out of the eighth bit from each of the shift registers 30-1 to 30-2, the next five bytes of the next line segment will be read out of graphic memory 14 and written into the five shift registers 30-1 to 30-5 of graphic buffer 24.

Figure 6:
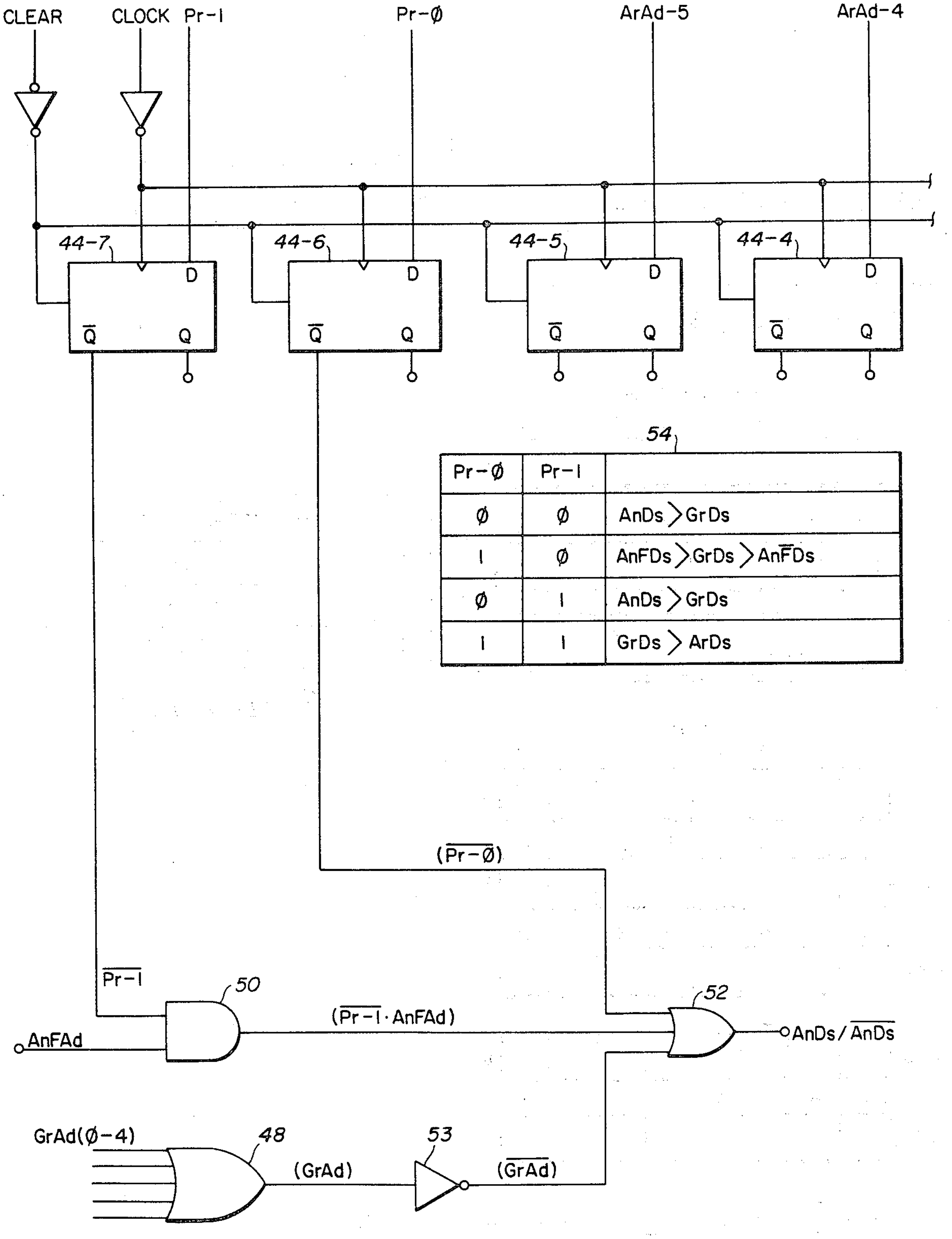
FIG. 6 is a schematic diagram of the color look-up address selector of the invention including a truth table showing the relationship between the priority signals and which mode of display has priority for the illumination of a given pixel.

FIG. 6 is a schematic block diagram of the control circuit for color look-up address selector 32 which implements the logic equation illustrated in FIG. 3. Byte 40 of the alphanumeric color address is loaded into latch 24 which consists of eight flip-flops 44. In FIG. 6, flip-flops 44-7 to 44-4 for holding or storing bits 4–7 of byte 40 are illustrated. Flip-flops 44-6 and 44-7 will have written into them from alphanumeric memory 12, priority bits Pr ∅ and Pr 1. Flip-flops 44-5 and 44-4 will have the two higher order bits of the alphanumeric color address, AnAd-5 and AnAd-4 those in bit locations 5 and 4 of byte 40 of FIG. 4, written into them. The foreground/background bit, F for foreground and $\overline{\text{F}}$ for background, for each pixel of a line segment after being loaded into shift register 26 are shifted out in synchronism with the raster scan of the CRT monitor and are applied to selector switch 32 over alphanumeric bus 36. Likewise, all five bits of the graphic address signal GrAd-0 thru 4 are applied to OR gate 48 which produces a graphic address signal GrAd if any of the five graphic color address bits on graphic address bus 36 is a logical 1. When a graphic color address is being applied to selector switch 32, at least one of the bits of the graphic color address will be a logical 1. In addition, the control circuit produces the GrAd signal in its inverted form $\overline{\text{GrAd}}$ which is true if no graphic color address is applied to selector 32. The signal $\overline{\text{Pr-∅}}$ is obtained from the $\overline{Q}$ output terminal of flip flop 44-6. The signal $\overline{\text{Pr-∅}}$ is one input to three input OR gate 52. The $\overline{Q}$ output of flip flop 44-7, Pr-1, is one input to two input and gate 50. The other input to and gate 50 is the signal AnFAd, produced by shift register 26 as each pixel is scanned. The output of AND gate 50 is the second input to OR gate 52. The third input to gate 52 is the signal $\overline{\text{GrAd}}$ produced by inverter 53. GrAd is produced when the pixel being scanned is not to display a graphic address, which occurs when the five bits of the signal GrAd-0 thru 4 are logical zeroes. The signal AnDs, if true, causes circuit selector switch 32 to apply the seven-bit alphanumeric address to the color look-up memory 16 and, if not true, then to apply the bits of the graphic color address to color look-up memory 16.

Truth table 54 in FIG. 6 describes the relationship between the priority signals Pr ∅ and Pr 1 and the color address signals which are applied to color look-up memory 16. If Pr 1 and Pr ∅ are both logical zeroes, then the alphanumeric color address AnAd will take precedence over the graphic color address signals GrAd. If Pr ∅ is a 1 and Pr 1 is a ∅, then the alphanumeric foreground color address AnFAd will take precedence over the graphic address GrAd, but the graphic address GrAd takes precedence over the alphanumeric background address signals $\overline{\text{AnFAd}}$. If Pr ∅ is a ∅ and Pr 1 is a 1, then the result is the same as if they are both zeroes; i.e., an AnAd will take precedence over the GrAd where the alphanumeric color address can be either a foregoing or background color. When Pr ∅ is a logical 1 and Pr 1 is also a logical 1, then the graphic address GrAd will take precedence over the alphanumeric AnAd in either of its two forms.

Figure 7:
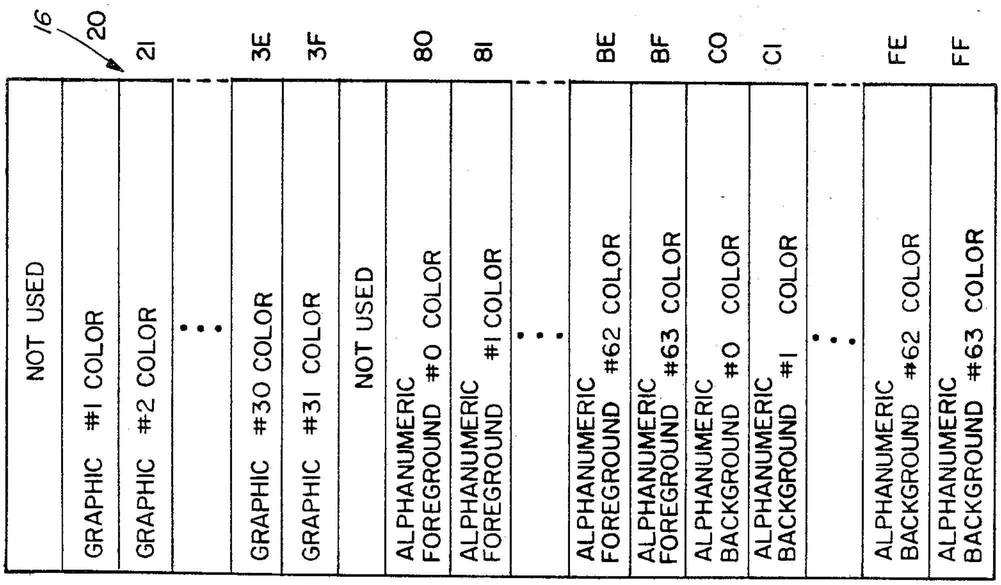
FIG. 7 is a memory map of a preferred example of the color look-up memory.

FIG. 7 is a memory map of color look-up memory 16, or that portion of a conventional random-access memory that is designated as a color look-up memory. Memory 16 is organized into groups of adjacent memory locations, one for graphic colors with each location for each graphic color address having a five-bit address which provides the possibility of up to 32 different combinations of colors and intensities for a pixel when in the graphic mode. The addresses of memory locations of memory 16 in FIG. 16 are in hexadecimal notation. Alphanumeric foreground colors are stored in up to 64 adjacent memory locations as are the alphanumeric background colors. Thus, the seven-bit alphanumeric address provides for up to 64 color intensity combinations for foreground alphanumeric displays and up to 64 color intensity combinations for background alphanumeric displays, preferably in adjacent memory locations. In the preferred embodiment, the color look-up memory 16 is a block of 256 adjacent memory locations having the same base address.

In FIG. 11, there is illustrated the format of a byte 56 of color control bits which are stored in a each addressable memory location of color look-up memory 16. The two lowest order bits, bits ∅ and 1, in the preferred embodiment, determine the intensity of the red color of the pixel; the next two lowest order bits, bits 2 and 3, determine the intensity of the green color; and bits 4 and 5 determine the intensity of the blue component of the color of each pixel. Bits 6 and 7 are used to determine the monochrome intensity and are used to make a permanent recording of the display.

In FIG. 12, truth table 58 establishes the relationship between the values of the control bits for each of the primary colors, red, green and blue. For example, when both bits are zero, then the color gun of the CRT of the monitor is off and the intensity of the display of the pixel being scanned will not include any color component corresponding to the color gun to which that control signal is applied. If the color control signals are ∅ and 1, then the intensity of the color component, red, green, or blue, would be $\frac{1}{3}$ of maximum; if they are 1 and ∅, it is at $\frac{2}{3}$ the maximum intensity; and, if they are both ones, they are at full or maximum intensity. The color control signals stored at each color look-up address when read out of color look-up memory 16 are applied to four conventional digital to analog converters 34 which produce analog control signals for the red, green or blue guns of a conventional color cathode ray tube. The fourth D to A converter is used to produce a monochrome analog signal.

Figure 8:
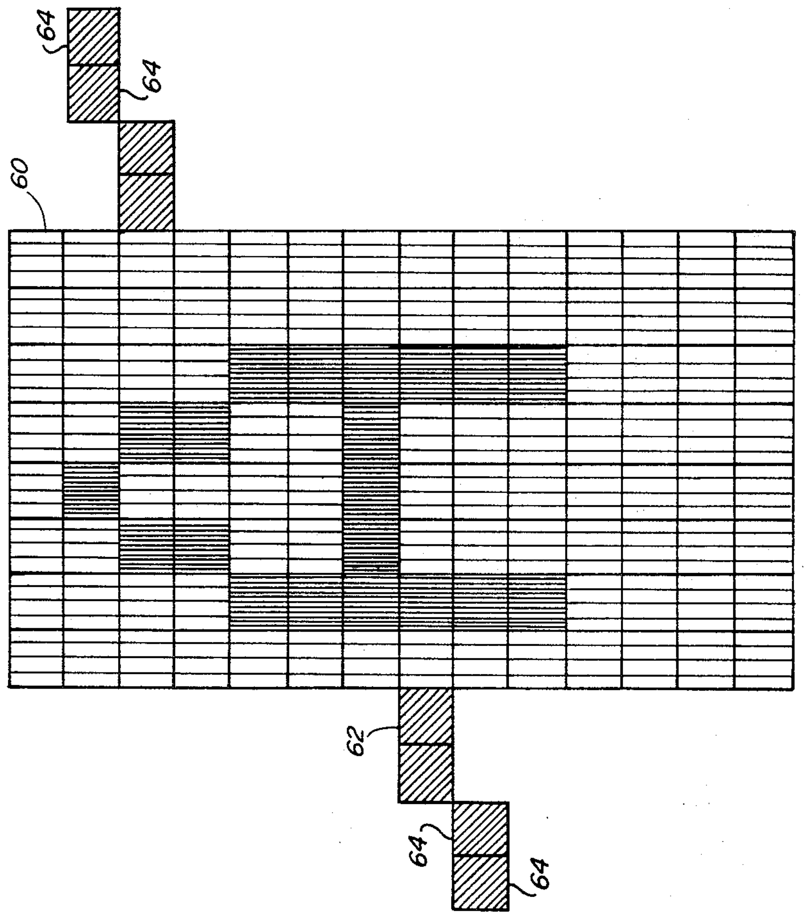
FIG. 8 illustrates the appearance of a cell in which the alphanumeric display has priority over the graphic.

In FIG. 8, there is illustrated the manner in which an element 60 of the array, or raster, of pixels of a CRT, where an element is a rectangular array of $8\times14$ pixels is energized to produce an alphanumeric display, in this case the letter A. Simultaneously, a graphic line 62 is being written through the element. If both of the priority bits are logical zeroes for each of the line segments of the element, and there are 14 of such segments in an element, then the graphic display within the alphanumeric element will be suppressed; i.e., only alphanumeric color control signals either background or foreground will be displayed in that element. As a result, the display of element 60 would appear substantially as in FIG. 8. The graphic pixels 64 which are shaded to indicate the color green would appear, if at all, in elements adjacent to element 60. The foreground alphanumeric display will normally be more intense, in this case the foreground pixels are shaded for a bright red so that the color-coded signals in bit positions ∅, 1 of the byte 56 will both be logical 1 so that the red color will be at its maximum intensity. Since the display is red, the control signals for green and blue will both be logical zeroes. The background is a less intensive red; i.e., has an intensity of $\frac{1}{3}$ that of the foreground, so that the corresponding color in the background address would be at a lower intensity; i.e., the color control signals for the red gun would be ∅, 1. The differences between the background/foreground color are the result of oppending the appropriate background/foreground bit from byte 38 to the alphanumeric control information bits ∅ through 5 of byte 40 with background/foreground bit being the highest order bit. When this bit is a logical one, the alphanumeric background colors are used to control the intensity of the display of the pixels in the alphanumeric display mode.

Figure 9:
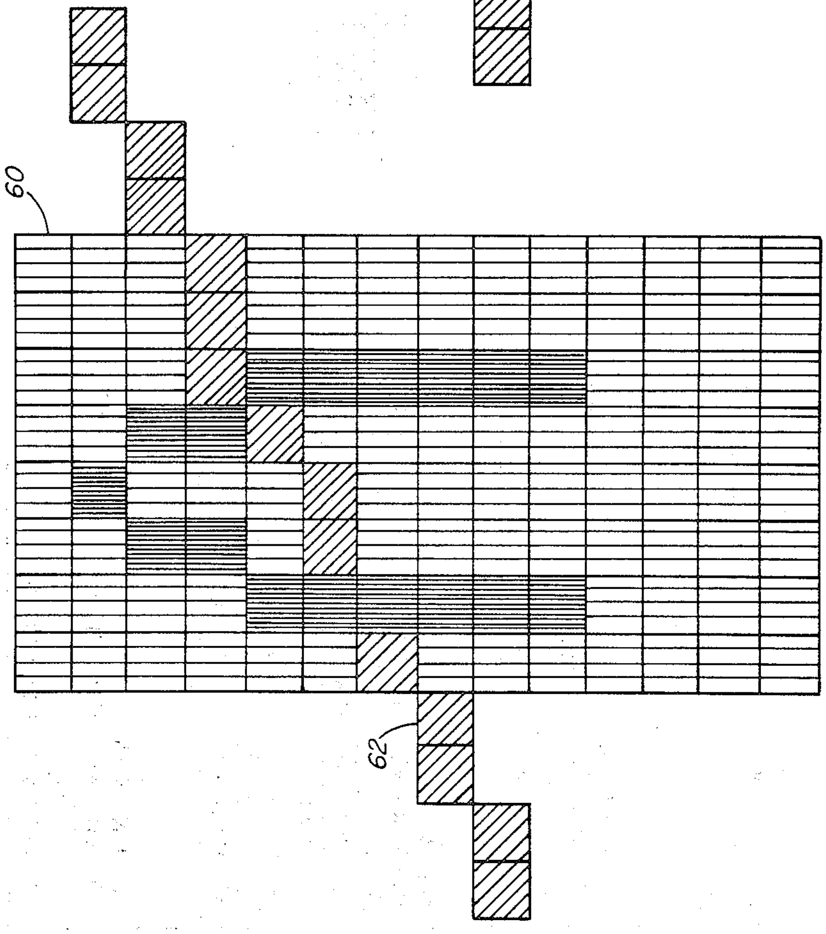
FIG. 9 illustrates the appearance of a cell in which the graphic display has priority over the alphanumeric background display.

In FIG. 9, the priority bits are such that Pr ∅ is a logical 1 and Pr 1 is a logical ∅, with the result that the graphic display takes priority within cell 60 over a background alphanumeric display, but not over a foreground alphanumeric display.

Figure 10:
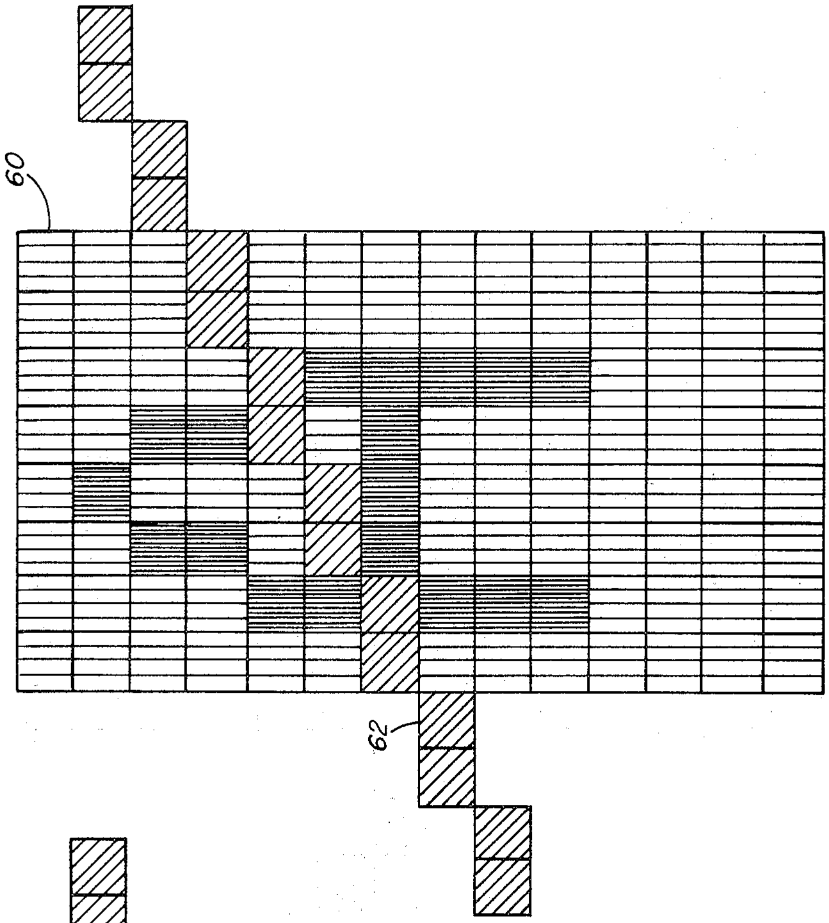
FIG. 10 illustrates the appearance of a cell when the graphic display has priority over the alphanumeric, both background and foreground.

In FIG. 10, the priority bits Pr ∅ and Pr 1 are both logical ones and, as a result, the graphic display mode for each pixel 62 takes priority over the alphanumeric display in each instance.

What is claimed is:

1. A method of controlling the display of a raster scan of an orthogonal array of picture elements of a color cathode ray tube in which each picture element has a unique binary address, an addressable display memory in which at each addressable location corresponding to that of a picture element an address in a color lookup memory for an alphanumeric color, for a graphic color and priority signals can be stored, and at which addressed location in a color lookup memory binary color signals representing the color and intensity of a pixel can be stored, comprising the steps of:

reading from the display memory and producing in synchronism with the raster scan of the CRT the graphic color address, the alphanumeric color address, and the priority signals stored therein for each pixel of the raster-scanned array;

applying to the color lookup memory the color lookup address having priority as determined by the priority signals;

reading from the color lookup memory binary color signals stored at the addressed location, said color signals representing the intensity of a plurality of predetermined colors;

converting the binary color signals for each predetermined color into an analog signal; and applying the analog signals for each predetermined color to the cathode ray tube to control the color and intensity of each pixel as it is scanned.

2. Apparatus for controlling the display of a raster scan of an orthogonal array of picture elements of a color cathode ray tube in which each picture element has a unique binary address, comprising:

an addressable frame memory in which at each memory location having an address corresponding to that of a picture element there is adapted to be stored an alphanumeric color address, a graphic color address and priority signals; an addressable color lookup memory in which at each memory location having an address corresponding to an alphanumeric color address and a graphic color address binary color control signals representing the color and intensity of a pixel are adapted to be stored;

first circuit means for reading from the frame memory and for producing in synchronism with the raster scan of the CRT the graphic color address, the alphanumeric color address, and the priority signals for each pixel of the raster-scanned array;

second circuit means for applying to the color lookup memory the color lookup address having priority as determined by the priority signals and for reading from the color lookup memory binary color control signals stored at the addressed location representing the intensity of a plurality of predetermined colors;

third circuit means for converting the binary color control signals for each predetermined color into a corresponding analog signal; and fourth circuit means for applying the analog signal for each predetermined color to the cathode ray tube to control the color and intensity of each pixel as it is scanned.

3. A method of controlling the display of a raster scan color cathode ray tube having an array of pixels with each pixel of the array having a unique binary number, comprising the steps of:

storing in a frame memory at addresses corresponding to the binary number for each pixel binary signals determinative of the color and intensity of each pixel in the array when in graphic display mode, when in alphanumeric mode, and binary priority signals determinative of the display mode for each pixel;

reading from the memory and producing the graphic binary signals, the alphanumeric binary signals and the priority signals associated with each pixel;

decoding the priority signals and applying to a color lookup memory the binary signals of the display mode having priority to produce binary signals representing the intensity of three primary colors; and converting the digital signals for each primary color to an analog signal and applying the analog signal to the cathode ray tube to control the color and intensity of each pixel of the array as scanned.

4. Apparatus for controlling the display of a raster scan color cathode ray tube having an array of pixels with each pixel of the array having a unique address, comprising:

a random-access memory including a frame memory portion and a color lookup portion having addressable memory locations for storing binary signals written into each such location;

a graphic controller for writing into the frame memory portion at memory locations having addresses corresponding to the address of the pixels, binary graphic color address signals determinative of the color and intensity of each pixel in the array when in a graphic display mode; binary alphanumeric color address signals determinative of the color and intensity of each pixel in the array when in an alphanumeric display mode, and binary priority signals determinative of the mode of display for each pixel, and for writing into the color lookup portion of memory, color control signals at addresses corresponding to the graphic and alphanumeric color address signals;

raster scan logic circuit means for producing the addresses of the pixels in synchronization with the raster scan and for reading from the frame memory the graphic color address signals, the alphanumeric color address signals, and the binary priority signals associated with each pixel;

selector means for decoding the priority signals and applying the color address signals of the display mode having priority to the color lookup memory portion;

circuit means for reading from locations of the color lookup memory portion having addresses corresponding to the color address signal binary color control signals representing the intensity of three primary colors; and digital to analog circuit means for converting the binary color control signals read from the color lookup portion of the random access memory to analog control signals, one for each primary color; and circuit means for applying the analog signals to a cathode ray tube to control the color and intensity of each pixel of the array as scanned.

5. A method of controlling the display of a raster scan of an array of pixels of a color cathode ray tube where each pixel has a unique address, comprising the steps of:

storing in a graphic addressable memory in locations having addresses corresponding to those of the pixels, binary graphic address signals of a memory location in a color look-up memory for each pixel of a graphic type display;

storing in an alphanumeric addressable memory in locations having addresses corresponding to those of the pixels binary alphanumeric foreground address signals or binary alphanumeric background address signals of a memory location in a color lookup memory for each pixel of an alphanumeric display;

storing in an addressable memory in locations having addresses corresponding to those of the pixels a set of binary priority signals, the values of which determine the priority of the type of display of each pixel;

storing in an addressable color lookup memory in locations having addresses corresponding to the graphic and alphanumeric address signals binary color control signals;

transmitting to the color lookup memory in synchroniusm with the raster scan an address at which is stored the binary color control signals determinative of the intensity of a plurality of predetermined colors of the type of display having priority as determined by the priority signals for each pixel and reading from that address in the color lookup memory said binary color control signals stored therein;

converting said binary color control signals for each predetermined color to an analog signal; and applying the analog signals to the cathode ray tube to control the color for each pixel as it is scanned.

6. In the method of controlling the display of a raster scan of an array of pixels of a color cathode ray tube as defined in claim 7 in which when the set of binary priority signals has one value, the graphic type display has priority over both alphanumeric types of displays; when the set of priority signals has another value, the alphanumeric types of displays have priority over the graphic type display; and when the set of priority signals has a third value, the alphanumeric foreground type display has priority over the graphic type display, and the graphic type display has priority over the alphanumeric background type display.

7. Apparatus for controlling the raster scan of an array of pixels of a color cathode ray tube where each pixel has a unique address, comprising:

an addressable memory having memory locations having addresses corresponding to the addresses of the pixels and having memory locations having color addresses corresponding to predetermined colors and intensities for a pixel;

a graphic controller for writing into the memory at locations having addresses corresponding to the addresses of pixels binary color address signals for each pixel when in a graphic display mode, binary color address signals for each pixel when in an alphanumeric background display mode, and binary color address signals for each pixel when in an alphanumeric foreground display mode; and a set of binary priority signals, the values of which determine the mode of display of each pixel; and for writing into the memory locations having color addresses, binary color control signals for controlling the intensity and color of a pixel;

raster scan logic circuit means for transmitting to the memory in synchronism with the raster scan of the cathode ray tube addressess of pixels being scanned and for reading from the addressed locations in memory the binary color address signals and priority signals for the pixels being scanned;

color lookup address selector means to which the binary color address signals and priority signals are applied for applying to the addressable memory the color address of the mode of display of each pixel substantially as scanned as determined by the priority signals, and for reading from the addressable memory the color control signals stored at the color address applied to the addressable memory by the color lookup address selector;

digital to analog circuit means to which the color control signals from the addressable memory are applied for converting said binary color control signals to analog signals; and circuit means for applying the analog signals to the cathode ray tube to control the color and intensity of each pixel as it is scanned.

8. In apparatus for controlling the raster scan of an array of pixels as defined in claim 7 in which when the binary priority signals have one value, the graphic display mode has priority over both of the alphanumeric display modes; when the binary priority signals have another value, the alphanumeric modes have priority over the graphic mode; and when the priority signals have a third value, the alphanumeric foreground display mode has priority over the graphic display mode, and the graphic display mode has priority over the alphanumeric background display mode.

* * * * *